(12) United States Patent
Bess et al.

(10) Patent No.: US 8,321,226 B2
(45) Date of Patent: Nov. 27, 2012

(54) GENERATING SPEECH-ENABLED USER INTERFACES

(75) Inventors: Charles E. Bess, McKinney, TX (US);
Chandra H. Kamalakantha, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 12/188,828

(22) Filed: Aug. 8, 2008

(65) Prior Publication Data
US 2010/0036665 A1    Feb. 11, 2010

(51) Int. Cl.
*G06F 17/28* (2006.01)
*G10L 11/00* (2006.01)
*G10L 21/00* (2006.01)

(52) U.S. Cl. ......... 704/270; 704/2; 704/231; 704/270.1; 704/275

(58) Field of Classification Search ........................ None
See application file for complete search history.

(56) References Cited

U.S. PATENT DOCUMENTS

| | | | |
|---|---|---|---|
| 6,603,837 B1 * | 8/2003 | Kesanupalli et al. ...... | 379/88.17 |
| 7,003,463 B1 * | 2/2006 | Maes et al. .................. | 704/270.1 |
| 7,287,248 B1 | 10/2007 | Adeeb | |
| 2002/0152244 A1 * | 10/2002 | Dean et al. ..................... | 707/530 |
| 2002/0188451 A1 * | 12/2002 | Guerra et al. ................. | 704/270 |
| 2002/0193997 A1 * | 12/2002 | Fitzpatrick et al. ........... | 704/270 |
| 2003/0155413 A1 * | 8/2003 | Kovesdi et al. ............... | 235/375 |
| 2005/0125232 A1 * | 6/2005 | Gadd .......................... | 704/270.1 |
| 2006/0111909 A1 * | 5/2006 | Maes et al. ..................... | 704/270 |

* cited by examiner

*Primary Examiner* — Justin Rider (57) ABSTRACT

Methods, systems, and apparatus, including computer program products, for automatically creating a speech-based user interface involve identifying a software service definition that includes service inputs, service outputs, and context data and accessing a standard user interface incorporating the service input and output. The standard user interface defines a set of valid inputs for the service input and a set of available outputs, at least one of which based on the context data. Audio data is associated with at least one of the inputs in the set of valid inputs to define a set of valid speech inputs. A speech-based user interface is automatically generated from the standard user interface and the set of valid speech inputs.

20 Claims, 8 Drawing Sheets

| DEPART | | ARRIVAL | | DATE | | | TIME | | | FLIGHT NO. | FLIGHT NO. |
|---|---|---|---|---|---|---|---|---|---|---|---|
| CITY | CODE | CITY | CODE | MONTH | DAY | HOUR | MIN | AM/PM | | | |
| Atlanta | ATL | Atlanta | ATL | January | 1 | 1 | 05 | am | 100 | A1B2C3 |
| Boston | BOS | Boston | BOS | February | 2 | 2 | 10 | pm | 102 | A2B3C4 |
| Dallas–DFW | DFW | Dallas–DFW | DFW | March | 3 | 3 | 15 | | 104 | A3B4C5 |
| Minneapolis | MSP | Minneapolis | MSP | April | 4 | 4 | 20 | | 106 | A4B5C6 |
| New York–JFK | JFK | New York–JFK | JFK | May | 5 | 5 | 25 | | 108 | B1C2D3 |
| San Diego | SAN | San Diego | SAN | June | 6 | 6 | 30 | | 110 | B2C3D4 |
| San Jose | SJC | San Jose | SJC | July | 7 | 7 | 35 | | 112 | B3C4D5 |
| Washington–Dulles | IAD | Washington–Dulles | IAD | August | 8 | 8 | 40 | | 114 | B4C5D6 |
| | | | | September | 9 | 9 | 45 | | 116 | C1D2E3 |
| | | | | October | 10 | 10 | 50 | | 118 | C2D3E4 |
| | | | | November | 11 | 11 | 55 | | 120 | C3D4E5 |
| | | | | December | 12 | 12 | 60 | | 122 | C4D5E6 |
| | | | | | 13 | | | | 124 | D1E2F3 |
| | | | | | 14 | | | | 126 | D2E3F4 |
| | | | | | 15 | | | | 128 | D3E4F5 |
| | | | | | 16 | | | | 130 | D4E5F6 |
| | | | | | 17 | | | | 132 | E1F2G3 |
| | | | | | 18 | | | | 134 | E2F3G4 |
| | | | | | 19 | | | | 136 | E3F4G5 |
| | | | | | 20 | | | | 138 | E4F5G6 |
| | | | | | 21 | | | | 140 | F1G2H3 |
| | | | | | 22 | | | | 142 | F2G3H4 |
| | | | | | 23 | | | | 144 | F3G4H5 |
| | | | | | 24 | | | | 146 | F4G5H6 |
| | | | | | 25 | | | | 148 | G1H2J3 |
| | | | | | 26 | | | | 150 | G2H3J4 |
| | | | | | 27 | | | | 152 | G3H4J5 |
| | | | | | 28 | | | | 154 | G4H5J6 |
| | | | | | 29 | | | | 156 | H1J2K3 |
| | | | | | 30 | | | | 158 | H2J3K4 |
| | | | | | 31 | | | | 160 | H3J4K5 |

GENERATING SPEECH-ENABLED USER INTERFACES

TECHNICAL FIELD

This description relates to generating user interfaces for computer-based services, particularly speech-enabled user interfaces.

BACKGROUND

Computer applications employ user interfaces to allow human users to communicate commands to the application and receive outputs from the application. Some user interfaces are specifically designed to accommodate a user's preferences or cognitive abilities. For instance, some GUIs order and arrange fields for input and presentation of data to appeal to users' intuitive visual preferences or to be otherwise visually pleasing to users. Some GUIs are capable of accepting inputs from peripheral hardware, such as keyboards, computer mice, joysticks, and touch-screens. Some GUIs are designed to accommodate learning and physical disabilities, for example, by allowing speech-based inputs through a microphone connected to the computing device. Other user interfaces also exist, including audio interfaces that accept speech-based inputs and present audio outputs. For instance, some automated phone systems implement speech-based user interfaces allowing a user to access a computer application, input requests to the application, and receive audio outputs from the application through a telephone device.

Some applications have been developed with parallel graphic and speech-based user interfaces. These can be used to expand an application to the visually impaired and other segments of an application's market. Typically, the graphic and speech-based interfaces are developed independently. Often, a speech-based interface equivalent of an application's graphic user interface is developed long after the emergence of the application and its GUI. Development of the speech-based interface involves hard-coding the audio-based inputs and outputs, and logic for the speech-based interface separately, in an attempt to duplicate the functions of the original graphic interface.

SUMMARY

Systems and methods can be implemented to automatically create a speech-based user interface from a standard user interface.

In one general aspect, a software service definition is identified. The service definition includes one or more service inputs, one or more service outputs and context data related to the service inputs and/or the service outputs. A standard user interface is accessed that incorporates the service inputs and the service outputs. The standard user interface defines a set of valid inputs for the service inputs and a set of available outputs. The set of valid inputs and/or the set of available outputs are defined based on the related context data. Audio data is associated with at least some of the inputs in the set of valid inputs for use with a speech recognition system to define a set of valid speech inputs. A speech-based user interface is automatically created from the standard user interface incorporating the set of valid speech inputs.

Implementations can include one or more of the following features. Audio data is associated with at least some of the outputs in the set of available outputs for use with a speech generation system to define a set of available speech outputs, and the automatically created speech-based user interface further incorporates the set of available speech outputs. The audio data includes at least two language sets. One or more speech outputs in the set of available speech outputs is validated based on one or more speech inputs in the set of available speech inputs. The speech-based user interface graphically presents an output from the set of available outputs. Speech-interface template data is received defining one or more rules used in the speech-based user interface to present a speech prompt or accept a speech input. A graphic user interface is automatically created from the standard user interface. The standard user interface defines conditions for presentation of individual available outputs from the set of available outputs. The set of valid speech inputs and the set of available speech outputs are associated with the software service definition to generate a reusable speech interface library for the service definition. Standard user interface data is modified with speech-specific template data to generate the speech-enabled user interface. Standard user interface data is received from a remote computer device.

In another general aspect, a specification server stores a software service definition and/or a standard user interface generated from the software service definition. The software service definition includes a set of valid inputs, a set of available outputs, and context data related to one or more inputs from the set of valid inputs or one or more outputs from the set of available outputs. An interface generator is adapted to automatically generate a speech-enabled user interface from the standard user interface by associating audio data with at least some of the inputs in the set of valid inputs. The speech-enabled user interface is capable of receiving speech-based user inputs through a speech recognition engine.

Implementations can include one or more of the following features. The automatically generated speech-enabled user interface is adapted to graphically present one or more outputs from the set of available outputs. The interface generator is adapted to automatically generate the speech-enabled user interface by associating audio data with each output in the set of available outputs. An audio data server is adapted to store at least one of the audio data associated with at least some of the inputs in the set of valid inputs or the audio data associated with at least some of the outputs in the set of available outputs for use in connection with the speech-enabled user interface. The audio data server is adapted to store the set of available outputs, and the set of available outputs include outputs in more than one language. The automatically generated speech-enabled user interface is adapted to identify a language of a speech-enabled input, interpret the speech-enabled input, and provide at least one output in the identified language of the speech-enabled input.

DESCRIPTION OF DRAWINGS

Like reference symbols in the various drawings indicate like elements.

DETAILED DESCRIPTION

Figure 1:
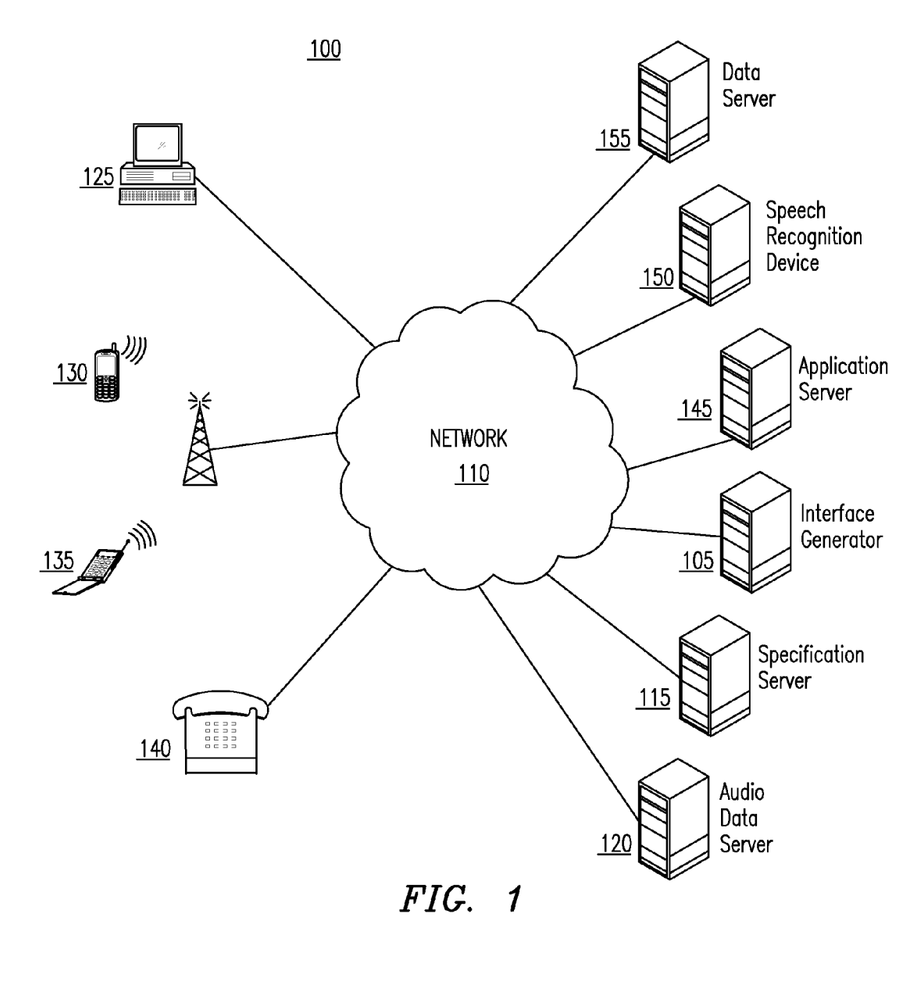
FIG. 1 is a block diagram illustrating an example configuration of a system for creating and providing a speech-enabled user interface.

FIG. 1 is a block diagram illustrating an example configuration of a system 100 for creating and providing a speech-enabled user interface. The system 100 includes an interface generator 105 capable of retrieving and/or receiving a standard user interface based on one or more service definitions. The interface generator 105 can communicate with other devices or servers using a network 110 to, for example, request and receive a standard user interface or service definitions from a specification server 115. The specification server 115 can be a remote computing device, such as a web server, or may be incorporated locally on the same computer or local network as the interface generator 105.

The interface generator 105 can be adapted to generate a speech-enabled user interface from the standard user interface and/or service definitions, by associating audio data with input and/or output requirements of the standard user interface. In some implementations of the speech-enabled user interface, audio data is only associated with the service inputs. Implementations of the speech-enabled user interface can combine a GUI with speech-based capabilities. For example, the speech-enabled user interface can be implemented as a speech-based kiosk, providing for speech-based inputs and graphical outputs. Other implementations of the speech-enabled user interface can provide for audio data being associated with both the inputs and outputs of the interface. Such implementations can allow for interfaces with solely speech-based inputs and audio outputs.

Some implementations of the interface generator 105 can automatically generate speech-enabled user interface. For example, an interface generator 105 can automatically identify necessary audio inputs and outputs. The interface generator 105 can automatically generate software code that defines the speech-enabled user interface including interfaces to speech-based output services (e.g., prerecorded or electronically generated audio) and speech-based input services (e.g., speech recognition, validation, and conversion to text or other data formats). In some implementations, the audio data used by the speech-based inputs and outputs can be automatically generated, for example through a speech synthesizer utilizing a text-to-speech system, or other speech generating system. In other implementations, the audio data may be pre-recorded audio data, for example recorded speech data articulating words and sounds corresponding to the input and/or output requirements. This speech data may be generated or stored locally on the interface generator 105 or may be accessed through network 110 from an audio data server 120 implemented as one or more remote computing devices. In some implementations, the speech data can include multiple languages. Multi-language speech data can allow the generated speech-enabled user interface to be compatible with multiple languages.

The speech user interface generated by interface generator 105 can be accessed and used by remote users 125, 130, 135, 140 over a network 110. The network 110 can be a telecommunications network capable of routing telephony, web pages, web applications and services, streaming data, and other multi-media data. The network 110 can be the Internet, a telephone or cellular phone network, or a combination of data networks. Users 125, 130, 135, 140 can access the speech interface using a computing device or telephony device, such as landline, satellite, and cellular telephones, personal digital assistants, smart phones, personal computers, and/or other wireless and hard wire communication devices. Some users 125, 130, 135, 140 may access the speech interface using devices equipped with assistive technology for the blind, visually-impaired, learning disabled, or otherwise physically impaired, such as touch screens, screen readers, and refreshable Braille displays. A user 125, 130, 135, 140 can access the speech user interface through, or as implemented on, an application provided by an application server 145. The application may be a web application or web service hosted or otherwise managed by the application server 145.

Software applications can be implemented from groupings of business processes packaged as software services using service-oriented architecture (SOA). Service-oriented architecture allows the application to be segmented into services capable of being accessed over a network and configured into complete applications. Services can be reused and integrated as building blocks in the development of other, new applications. Some services are XML-based, implemented as web service description language (WSDL) files in connection with the SOAP protocol.

A user 125, 130, 135, 140 can enter speech inputs into the speech interface over network 110 corresponding to the speech user interface inputs. A speech recognition device 150 can be included in connection with the speech user interface to interpret the speech inputs and convert these inputs into computer-readable data. The speech recognition device 150 can be software or a service integrated into the speech interface code itself, an API of the user device operating system, can be an API of the application server 145, a service provide by a remote speech recognition device 150, or other implementation. The application server 145 can respond to these speech-based requests received through the speech user interface by accessing and retrieving data relating to the input. This data may be retrieved from a remote or local data server computing device 155. The application sever 145 can process the retrieved data or otherwise respond to user input by transmitting audio data to the user 125, 130, 135, 140 through the speech-enabled interface.

The audio data may be stored locally on the application server 145, or retrieved remotely from the interface generator 105 or audio data server 120. Indeed, implementations of system 100 may combine one or more of the interface generator 105, specification server 115, audio data server 120, application server 145, speech recognition device 150, and data server into a single computing device or local computer network. For example, one or more of these system components 105, 115, 120, 145, 150, 155 can be subsystems within a single computing device. Additionally, other implementations may provide for one or more system components 105, 115, 120, 145, 150, 155 to be stored locally in connection with a user's communication device. For example, speech recognition device 150, application server 145, data server 155, and other components, can, in some implementations, be incorporated into a user communication device.

Figure 2:
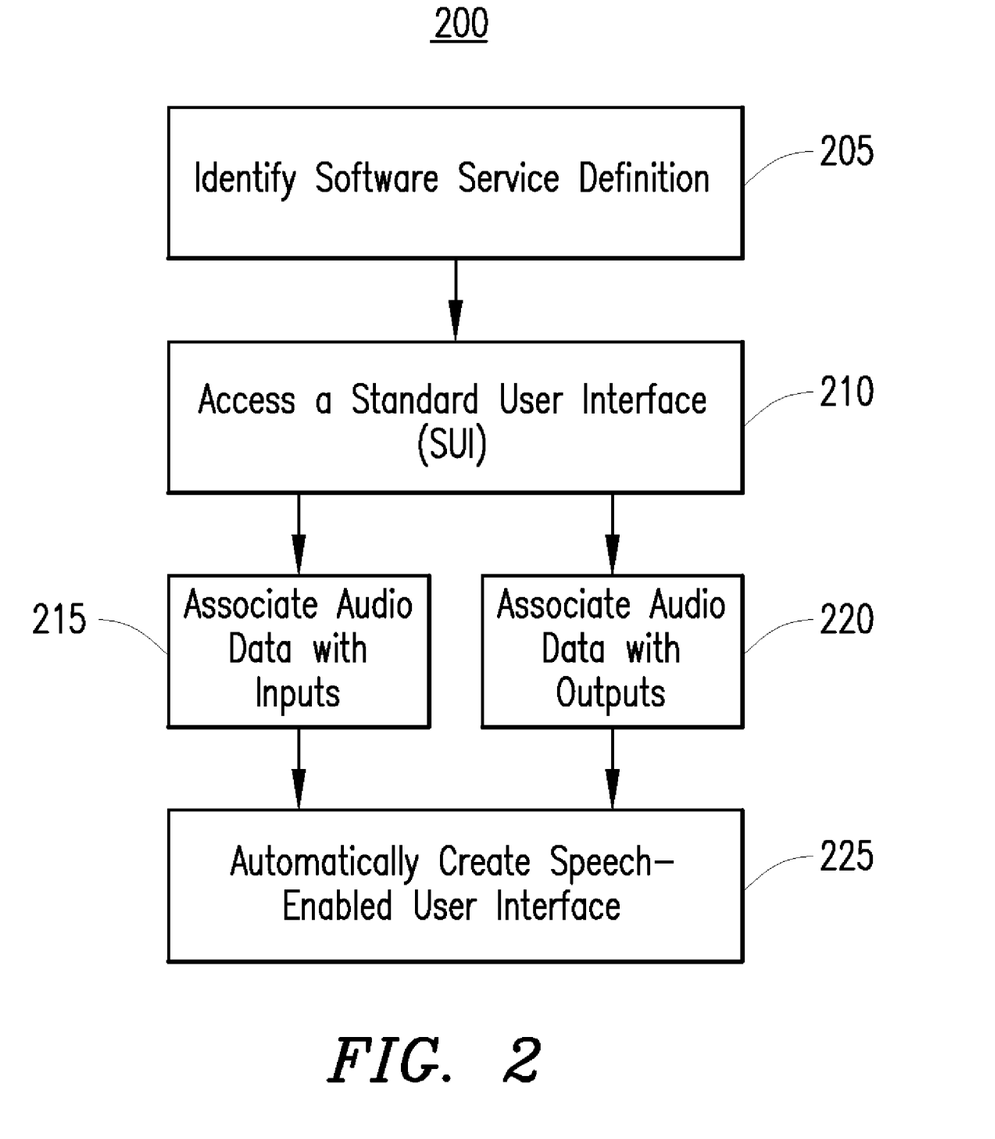
FIG. 2 is a flow diagram of an example technique for generating a speech-enabled user interface.

FIG. 2 is a flow-diagram illustrating an example technique 200 for generating a speech-enabled user interface. At 205 a software service definition is identified. A standard user interface (SUI) is identified at 210, based on the service definition. Audio data is associated with identified inputs at 215 and outputs at 220 of the SUI, through which a speech-enabled user interface can be automatically created at 225.

A service definition can be selected by assessing the requirements and desired deliverables of the solution or application for which the user interface is to be provided. The service definition can define a service that is to be incorporated in the solution or application as well as a standard user interface for the service. The service definition can be a XAML, AJAX, or other XML-based file, capable of being parsed to define characteristics and requirements of the service or a standard user interface related to the service. A service can be a defined, computer-implemented function. A collection of services can be used to build an application or solution, including solutions based on service-oriented architecture (SOA). Additionally, pre-existing services can be combined to form a new service.

The service definition of one or more services can define the user input requirements, the output requirements of the service, as well as context metadata relating to the inputs and outputs. A service definition can be used to build a standard user-interface (SUI) related to the service definition. A SUI generated from or otherwise relating to the service definition can be accessed at 210. Accessing the SUI may include generation of the SUI from the identified service definition. The SUI can define a set of valid inputs that could satisfy the one or more inputs required for the one or more services to be performed using the SUI. The SUI can also define the available outputs for these one or more services. These inputs and outputs can be derived from the input and output requirements of the one or more corresponding service definitions used to generate the SUI.

The set of valid inputs and available outputs of a SUI can be based on the context data. Context data can be metadata associated with and defining relationships among different inputs, among different outputs, or between inputs and outputs. Context data can include validation rules for certain inputs, as well as specify what type of data can or should be accepted as an input. Context data can be used to filter or sort the inputs or outputs of the service definition, for example, to limit the set of valid inputs of the SUI. For example, a service definition used to generate a SUI can describe a service for looking up the book value of a used car. The service definition can provide for a "car make" input, limiting the inputs to a set of car manufacturer names. A "car model" input can also be provided, with context data linking car make input option with car model input options corresponding to car models belonging to a certain car make. This can allow the SUI to limit the valid inputs for the car model input based on a previous car make input.

In implementations allowing for a number of different language inputs and/or outputs to be compatible with a speech-enabled user interface, logic can be included for determining the language of the user of an interface from an initial user input. For instance, the language of the initial input may be identified. Based on this determination, context data identifying the language of each input can constrain the set of valid future inputs to those inputs in the user's language. Context data can also prescribe the language of outputs to the user. Additionally, some speech generation engines may have voice-recognition capabilities for determining a specific user's voice. Voice-recognition can allow a speech-enabled user interface to authenticate a user based on an initial input. In some implementations, voice recognition can be used in connection with context data, the context data constraining the set of valid future inputs based on the established identity of the user.

Audio data can be associated with the set of valid inputs identified from the SUI at 215. The audio data can be acoustic models, pre-recorded speech, or other data corresponding to the set of valid inputs. For example, acoustic models can be used in connection with a speech recognition device, the acoustic models providing context for determining whether a speech-based input received by a speech-enabled user interface is valid. Input audio data can be original data created to be customized to the identified set of valid inputs, or may be a retrieved from pre-developed audio data dictionaries. Associated audio data can also be used to streamline the speech recognition tasks of the interface or corresponding software application. For example, many operating systems possess their own speech recognition APIs. These speech recognition systems may consult a dictionary of possible reference words, upon which acoustic models are based for interpreting a user speech input. The associated audio data can serve as a sub-dictionary for use by the speech recognition system, to constrain or, in some cases, expand the dictionary of possible interpretations to the set of valid inputs. This can mitigate against the speech recognition engine misinterpreting a speech input for another term in the speech recognition engine's dictionary, as well as serve to pre-validate speech-based inputs. Other implementations of the speech recognition system may perform speech recognition by employing a general dictionary, with returned speech recognition results then being compared and validated against valid inputs in the set of valid inputs.

Audio data can also be associated with the set of available output data at 220. In some implementations, user interface outputs can include user prompts for additional inputs, error messages, returned data presented to the user, or other data presented to the user. The output data may or may not be presented in response to inputs received by the interface. Where outputs are presented in response to received inputs, when and how these outputs are presented can be determined by a set of rules. These rules can be provided as context data (e.g., metadata) stored in connection with the inputs and outputs. Output rules can also be provided in connection with interface template data used to build one or both of the SUI and speech-enabled user interface. Output rules can define the command-and-response of the interface. Context data and interface template data can also be used to validate inputs received by the user interface. For example, in lieu of a discrete set of valid inputs, input rules can be used to determine whether a given input received by the interface is valid. For instance, if an interface calls for the user's age, for example, in an interface provided in connection with a medical or health-oriented service, it may be desirable to validate the received input against a valid data type, such as a mathematical integer value within a certain range. A data type can be a formal computer data type such as an integer, string, etc. or a descriptive category of data such as the name of a world city, a product brand name, a phone number, etc.

The same rules and interface templates used to outline the command-and-response functionality of the SUI as well as validation of inputs received by the SUI can also be used in the speech-enabled user interface. Upon populating the valid inputs and available outputs with audio data at 215 and 220, a speech-enabled user interface can be automatically generated, piggy-backing on the structure of the SUI, including the rules, context data, and interface template incorporated in the SUI. The speech-enabled user interface is automatically generated based on the SUI at 225. Code is automatically generated for the speech-enabled user interface, automatically equipping the basic SUI with audio input and output functionality. Code can be generated, for example, by automatically assembling code snippets, inserting code into a code template, pointing SUI input and/or output blocks to audio input and/or output data locations, or otherwise rendering SUI code to translate the SUI code into speech-enabled, SUI-based interface code. In some implementations, speech recognition functionality can be automatically implemented within the code, adapted to function in concert with the SUI. Additionally, memory locations of and context metadata relating to input and output audio data can be automatically incorporated into the code.

Some implementations of the speech-enabled user interface, automatically formed from the SUI, can also incorporate supplemental interface templates, context data, and rules specific to a speech-enabled user interface. In some implementations, the command-and-response functionality and input validation needs of the speech-enabled user interface may be incongruent with those provided by the SUI. For instance, GUIs, for which some SUIs can be originally constructed, can present several output presentations and input prompts in parallel on the screen. The input-output command-and-response of a speech-enabled user interface, on the other hand, can be limited to serially presented prompts, inputs, and outputs. To meet the specific needs of certain speech-based interfaces, additional template data can be automatically retrieved during conversion of the SUI to a speech-enabled user interface, to provide the speech-based interface with the desired speech-specific functionalities.

Figure 3:
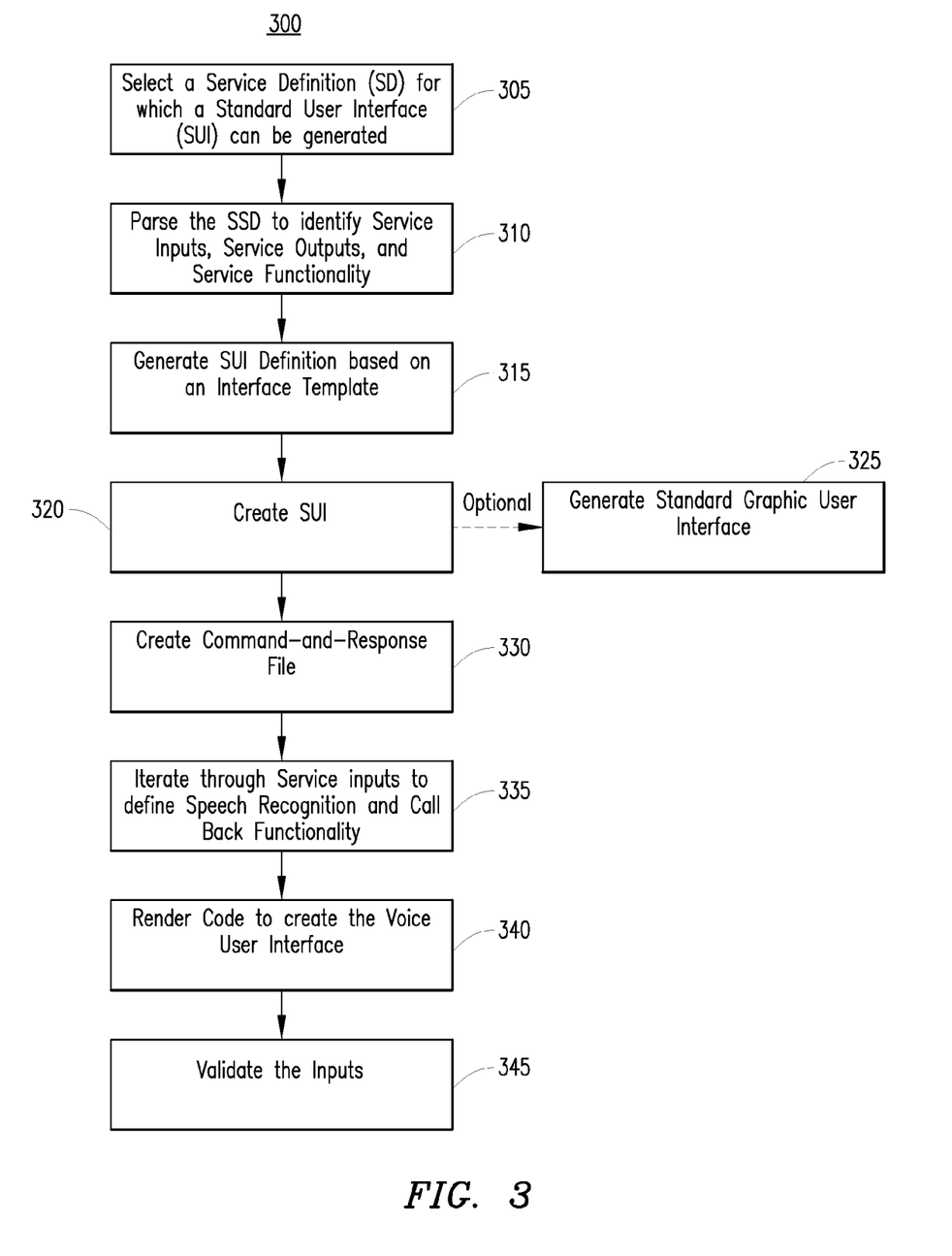
FIG. 3 is a flow diagram of an example technique for generating a speech-enabled user interface from a service definition.

FIG. 3 is a flow diagram of one implementation of the technique for generating a speech-enabled user interface from a service definition. A service definition (or "SD") for which a SUI can be generated is selected at 305. The service definition is parsed at 310 to determine the required inputs and outputs for performing the functions of the service definition. Parsing the service definition can also serve to identify the types of inputs and outputs that are required, as well as context metadata associated with the inputs and outputs. The functionality of the service can be identified by parsing the service definition, for example, identifying command-and-response rules or input validation rules for the service. In other implementations, additional interface template data can be associated with the service definition to provide the command-and-response, validation, and other functional structure for the service or a user interface for use with the service. The data defining the input and outputs requirements, as well as the functionality of the service can be used to be build an interface template. A SUI definition can be generated from an interface template at 315. For example, the SUI definition can be an XAML, AJAX, html, or other file.

A SUI can be created from the interface template structure and interface definition at 320. A SUI can serve as the generic structure for building a user interface. In some implementations of technique 300, a GUI can be generated from the SUI. A GUI built from the SUI can serve as the graphical analogue to a speech-enabled user interface based on the same SUI and capable of interfacing the same service. The SUI can also serve as the structure for building speech-enabled user interfaces, including speech-only interfaces and speech-based kiosk interfaces. The same SUI can be used to construct parallel speech-enabled interfaces and GUIs for the same services underlying the SUI.

Additionally, a command-and-response file can be created at 330 from the SUI, setting forth the set of allowable inputs and available outputs of the SUI. Iterating through the set of inputs, audio data can be assigned to the individual inputs within the set to define speech recognition references at 335. Iterating through the set of available outputs, audio data can be assigned to the individual outputs to enable the audio call back, or response, functionality of the speech-based interface at 335. Data files of the SUI, the audio input set, and audio output set can then be rendered at 340 to build code linking the audio input set and audio output set to the SUI functionality to create the speech user interface. Speech recognition algorithms, and other speech-specific interface files can also included during parsing, and built in to the speech-enabled user interface code. Successful rendering of the code can be tested by validating the functions of the speech-based interface at 345. For example, sample audio inputs can be entered into the speech-enabled user interface to test validation of allowed inputs, as well as command-and-response functionality of the service tied to the interface.

Figure 4A:
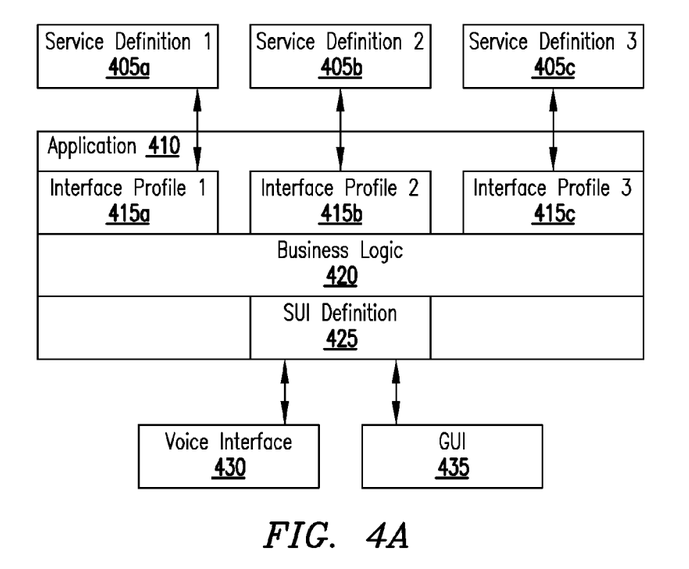
FIG. 4A is a block diagram of an example configuration of a speech-enabled user interface generator.

Referring now to FIG. 4A, a block diagram of an example interface generator 400 for creating a speech-enabled user interface is depicted. Some implementations of a speech-enabled user interface can be based on a SUI incorporating more than one service definition. Other implementations may only be based on a single service definition. FIG. 4A shows three service definitions 405a, 405b, 405c, for example XAML files, received by an interface generator application 410. The interface generator can automatically create interface profiles 415a, 415b, 415c for each of the service definitions 405a, 405b, 405c. The interface profiles 415a, 415b, 415c can define the input and output requirements of the respective service definitions 405a, 405b, 405c. The input and output requirements may define sets of valid inputs and available outputs, including context metadata associated with at least one of the inputs and/or outputs. Business logic 420 is applied to the interface profiles 415a, 415b, 415c of the services 405a, 405b, 405c to automatically build a SUI definition 425 for the combination of services 405a, 405b, 405c. Business logic 420 can identify metadata and other tags associated with the functionality, inputs, and outputs of the service definitions 405a, 405b, 405c to generate code relating to the functionality of the interface, for example, the command-and-response structure of the interface and input validation. Business logic 420 can also further identify redundancy between the service definitions as well as synergize functions of the different service definitions into potential new functions capable of being performed by the SUI.

The SUI definition 425 can be converted into a speech-based interface 430 or a GUI for the service definitions upon which the SUI 425 is based. Additional template data and logic can be retrieved and applied to transform the SUI 425 to a speech-enabled user interface 430 or GUI 435. For instance, a style sheet can be retrieved and applied to build a GUI 435. In certain implementations of the speech-enabled user interface 430, speech-specific logic and template files can be incorporated to modify the SUI definition 425 to build the speech-based user interface.

Figure 4B:
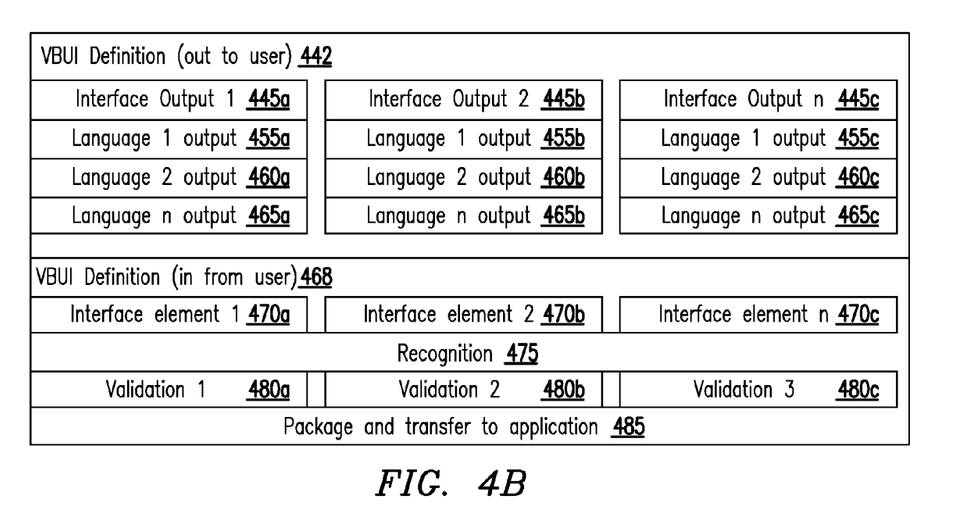
FIG. 4B is an example table illustrating inputs and outputs of a speech-enabled user interface.

FIG. 4B illustrates a data configuration table 440 of an example speech-based user interface, for example speech-based user interface 430. The definition 440 can include a definition 442 of the requisite output elements 445a, 445b, 445c and available outputs 455a-c, 460a-c, 465a-c. A set of available outputs 455a-c, 460a-c, 465a-c can be identified and adopted by the speech-based user interface relating to respective interface output elements 450a, 450b, 450c. The outputs can be audio data result presentations, audio prompts for inputs from the user, and other audio outputs. Audio data files corresponding to the set of available outputs 455a-c, 460a-c, 465a-c can be stored in connection with each output element 445a, 445b, 445c for each supported language. For example, 455a may be an English audio file corresponding to output element 450a, 460a a Spanish language audio file for output element 450a, and 465a the French instance of 450a.

A second part 468 of the speech-based user interface definition can include speech-based input data corresponding to interface elements 470a, 470b, 470c. The input interface elements 470a, 470b, 470c may or may not correlate directly with the output (e.g., input element 470a could be the set of valid inputs in response to a prompt defined by output element 450a). The input definition 468 can provide a speech recognition component 475. The speech recognition component 475 can perform speech recognition, for example speech-to-text or speech-to-data transforms. Data generated by the speech recognition component 475 can be passed to validation components 480a, 480b, 480c. The validation components 480a, 480b, 480c can be input element specific (e.g., validation component 480a can correspond to input element 470a). Validation components 480a, 480b, 480c can maintain a dataset of valid inputs. In some implementations, the speech recognition 475 and validation components 480a, 480b, 480c can be combined into a single component, or into input-element-specific components. Where the speech recognition component 475 incorporates a statistics-based algorithm, limiting the valid set of inputs can help limit the universe referenced during speech recognition, increasing the efficiency of the speech recognition component in some implementations. Additionally, other implementations can store audio files of the valid inputs, including valid foreign language equivalents, audio files that can be used by some speech recognition components 475 to recognize and validate audio inputs. Still other implementations of the speech-based user interface may forego validation of the input, translating the input into usable data through the speech recognition component, delegating validation to the application or service supporting the speech-based user interface.

Upon translating the audio inputs received by the speech-based user interface user into a data format readable by an application or service using the speech-based user interface, and, in some implementations, validating the inputs, the processed input data can be packaged and transferred 485 for additional processing by the application itself, for example as a database query, or other data input.

Figure 5:
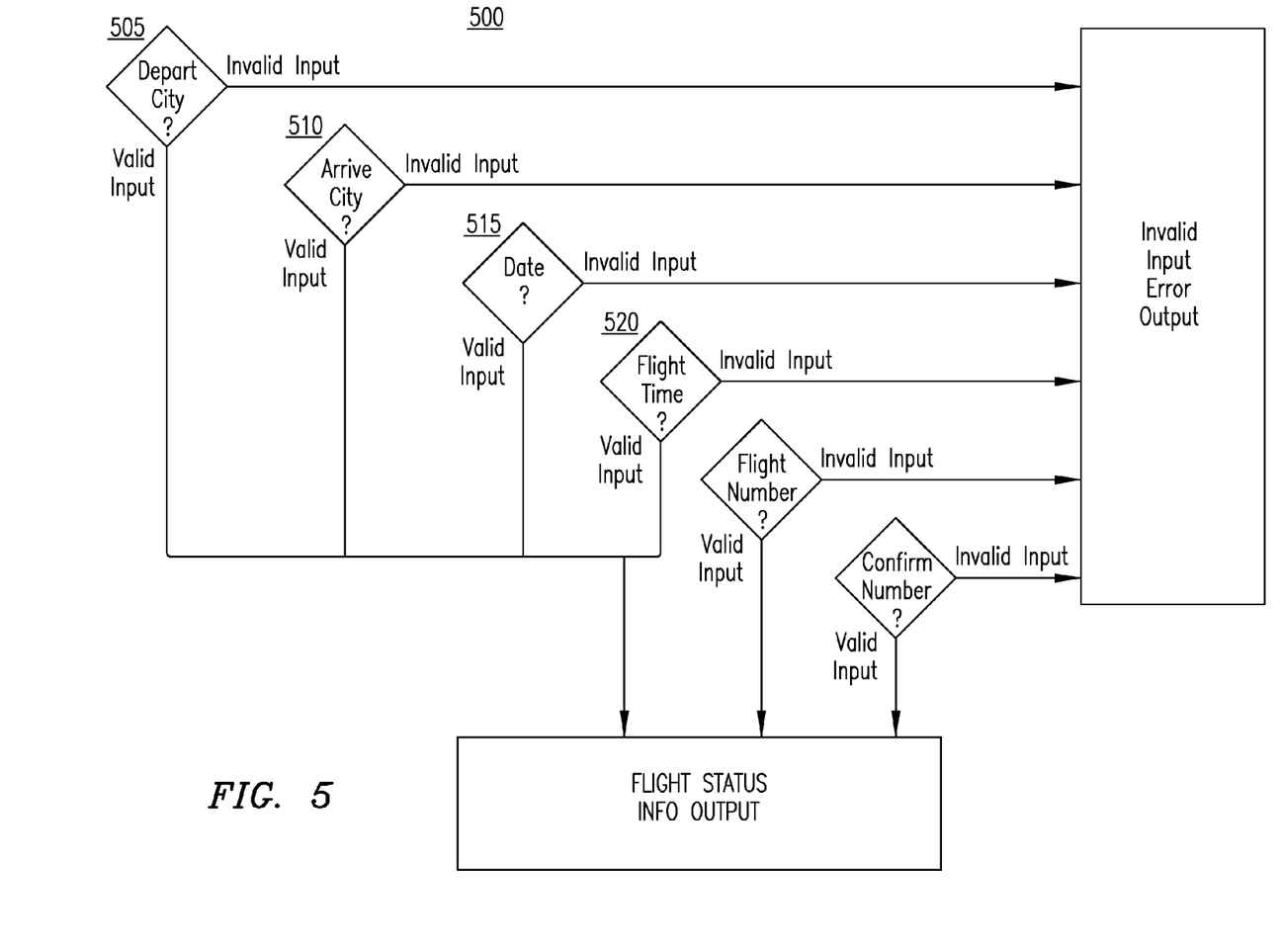
FIG. 5 is a flow diagram of an example service definition.

FIGS. 5-8 illustrate one example of an implementation for generating a service definition into a speech-enabled user interface. The example of FIGS. 5-8 pertains to a service for checking the status of a flight. Service definitions, however, are not limited to airline flight status checking, but can include any computer service. Other service definitions, for example, can relate to investment monitoring, travel reservations, credit applications, e-commerce, network searching, and any other computer-aided application or function. FIG. 5 is a flow diagram for the execution of a service for checking the status of a commercial flight. The status can be checked by entering one of a flight number, a passenger confirmation number, or a combination of flight date, departure and arrival locations. A service definition may be generated based on the flow diagram of FIG. 5, defining input elements of departure city 505, arrival city 510, flight date 515 and time 520, flight number 525, and confirmation number 530. Outputs can also be defined for the service, including prompts for user entry of one of the input elements 535, 540, 545, 550, 555, 560, error messages for invalid inputs 565, as well as flight-specific status outputs 570. The service definitions based on flow diagram FIG. 5 can be used as the basis for creating a SUI corresponding to the functions illustrated in FIG. 5.

Figure 6:
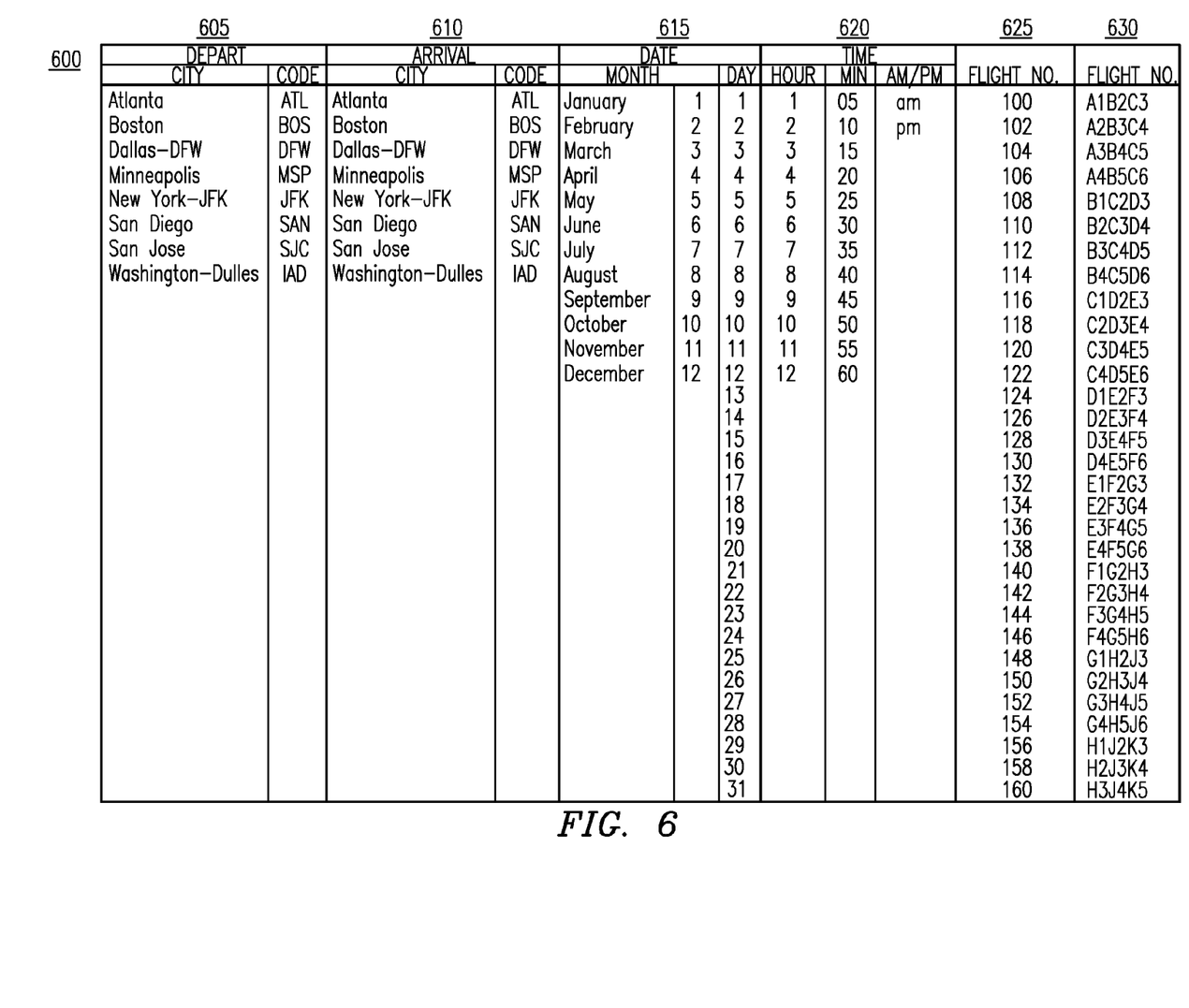
FIG. 6 is an example data configuration corresponding to an example service definition.

FIG. 6 shows a set of valid inputs for an example service definition, similar to one based on the flow diagram of FIG. 5. The input set 600 can be incorporated into a SUI based on this service definition. Input elements can include departure city 605, arrival city 610, flight date 615 and time 620, flight number 625, and confirmation number 630. The service definition can be generic and include an input set including arrival city inputs for any available airport, departure time, etc. Alternatively, the service definition can be entity-specific, for example, tailored to a specific airline. The input set of a generic service definition can be transformed into entity- or application-specific input sets, for example, by filtering or sorting the input set based on one or more criteria characteristics, thereby narrowing the set of valid inputs.

The example of FIG. 6 shows a limited set of valid departure and arrival cities, available departure times, flight numbers, and confirmation numbers based on flights offered by the airline. Some inputs elements, such as the subset of valid subset of flight date inputs 615, 620, can be limited to a month data type, and a data type corresponding to the available day component of the date. Context metadata (not shown in FIG. 6) can serve to build associations between the various input elements. In some implementations of this example, context metadata could associate a flight number input with a departure city input, arrival input, date, and time inputs, and confirmation number inputs corresponding with the flight number. Metadata can serve to limit the set of valid inputs. For example, if the user inputs a departure city and an arrival city, valid date and time inputs could be limited to only those dates and times corresponding to flights from the departure city to the arrival city offered by the airline. Additionally, some implementations may provide for input element categories. For example, a departure city input could be the city name or the airport code. In other implementations, a month input for the flight data could be the name of the month or the number corresponding to the month (e.g., January=1, February=2, etc.). This can allow the interface to validate substitute terms for a given input.

Continuing with the example of FIGS. 5 and 6, having defined the set of valid inputs 600 for a airline-specific flight status lookup service definition and/or SUI, audio data can be associated with each of the individual inputs in the input set 600 to enable a speech-based user-interface. The audio data can be automatically generated or prerecorded audio corresponding to each input in the input set. This audio data can define a valid input dictionary, capable of being used by a speech recognition engine to interpret a user's speech-based inputs to a speech-based user interface based on the service definition or SUI corresponding to FIGS. 5 and 6. The dictionary can be used by an embedded speech recognition application or a speech recognition API of the operating system of the user's computing device to limit the universe of possible user input interpretations. The dictionary can also serve to validate received inputs. Validation can occur after speech recognition or through speech recognition. For example, if the speech recognition engine operating in conjunction with speech-based user interface is equipped with a speech reference dictionary of only the set of valid inputs, user speech-inputs that do not sound like an input in the set of inputs can result in the speech recognition failing to interpret the input, thereby resulting in an invalid input to the interface, in which case the user may be notified of the invalid input and prompted to provide a valid input. In some implementations, an invalid input may be resolved to a reasonably similarly sounding valid input. Additionally, alternative expressions can be valid inputs, where the set of valid inputs allows these alternatives. For example, a user wishing to input Atlanta as the departure city could articulate "Atlanta" or "A-T-L" and have either input understood and validated as a proper input for the Atlanta as the departure airport.

Figure 7:
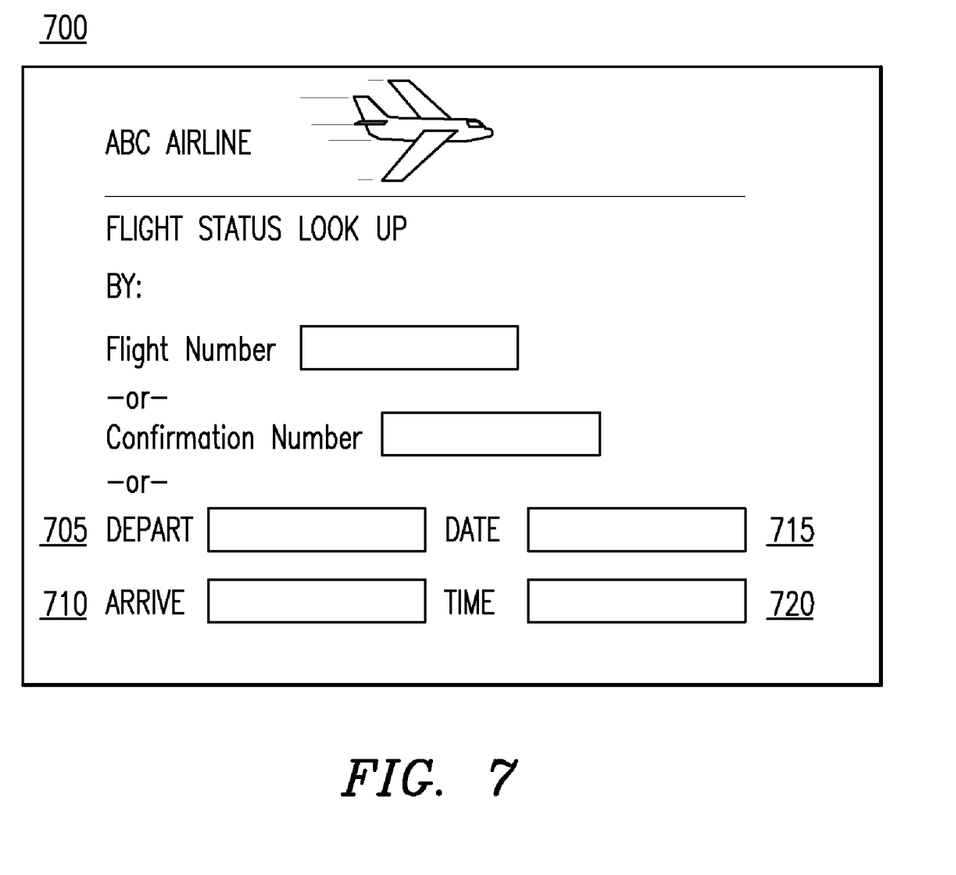
FIG. 7 is an example screenshot of a graphical user interface related to an example service definition.

FIG. 7 illustrates an example GUI 700 that could be created from the service definition and SUI corresponding to FIGS. 5 and 6. As illustrated, GUIs can present multiple outputs to a user at a single time, for example, simultaneous prompts for flight number, confirmation number, departure city, etc. Additionally, a GUI can potentially accept several inputs from a user at one time. For example, a user of the GUI 700 could input a departure city name 705, arrival city name 710, and date 715 and time 720 of departure in a single form 700.

Figure 8:
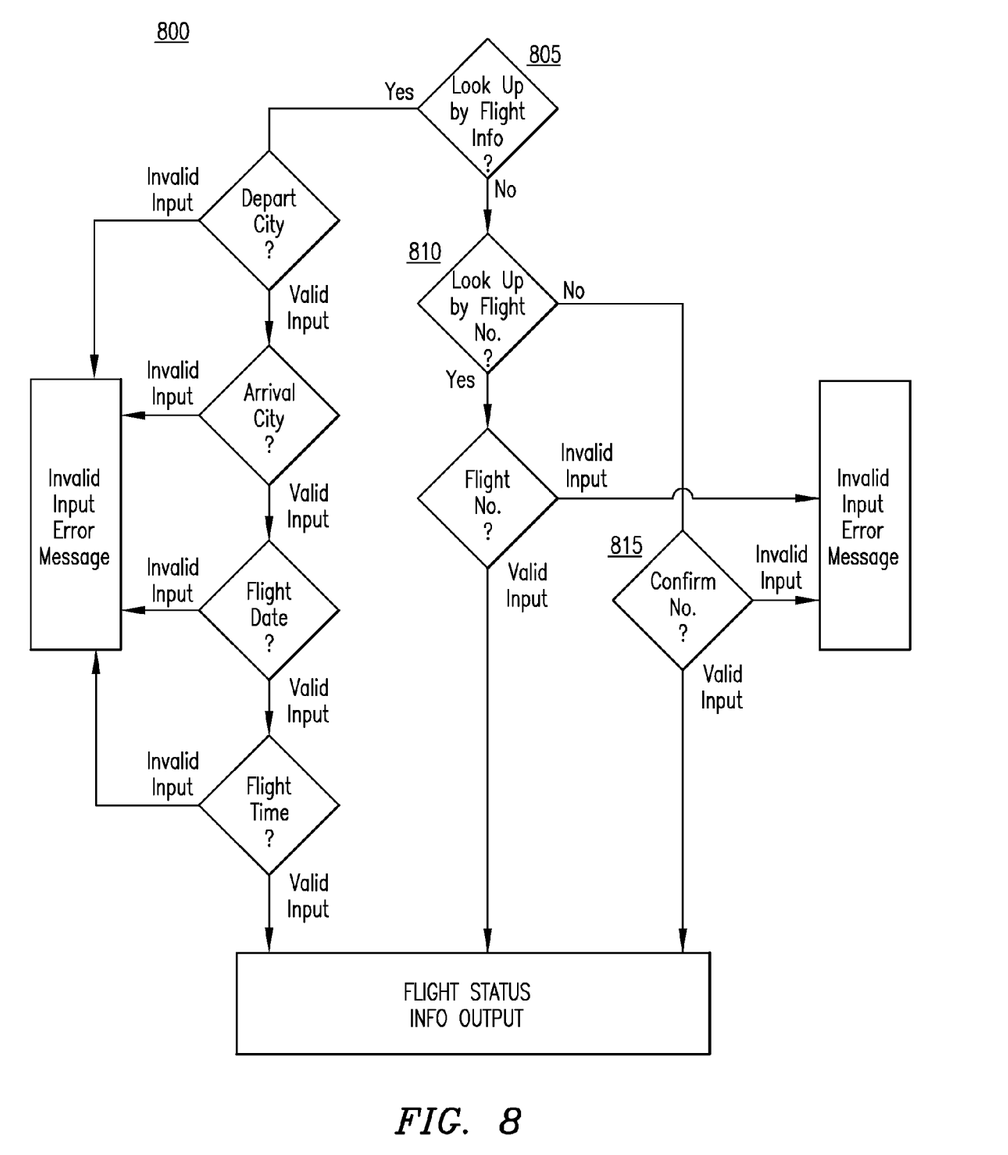
FIG. 8 is a flow diagram of an example service definition function modified for a speech-enables interface.

Unlike GUIs, speech-based user interface present and process outputs and inputs serially. For example, in comparison with the flow-diagram of FIG. 5, FIG. 8 illustrates an example of a flow diagram for executing the service in FIG. 5 serially using a speech-based user interface. In order to serially perform the service definition based on FIG. 5, additional logic and instructions may be required during rendering to create the speech-based user interface from the corresponding SUI. For example, speech-based interface template data can provide instructions as to how and in what order inputs can be received. The speech-based interface template data can also instruct how the command-and-response structure of the SUI is to be modified so as to maintain the desired serial progression of the speech-based user interface. In some examples, the template data may order the input based on human speech and communication patterns. For example, it may be determined that a user of the flight status service would be more likely prefer to search for the flight using flight arrival and departure details, rather than an assigned flight number or confirmation number, prompting a user prompt for inputs related to these flight details 805 prior to an alternative prompt for the flight 810 or confirmation number 815. Additional prompt outputs may need to be added in order to solicit alternative inputs serially, as opposed to in parallel as in GUI 700. Instructions from the speech interface template data can be incorporated into the final speech-based user interface code generated during rendering of the SUI together with the speech interface template data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a software service definition comprising at least one service input, at least one service output and context data related to at least one of the service input or the service output, wherein no audio data are associated with the software service definition;
   accessing a standard user interface that incorporates the service input and the service output, the standard user interface defining a set of valid inputs for the service input and a set of available outputs, wherein at least one of the set of valid inputs or the set of available outputs is based on the related context data, wherein no audio data are initially associated with the software standard user interface;
   associating audio data with at least some of the inputs in the set of valid inputs for use with a speech recognition system to define a set of valid speech inputs; and
   automatically creating a speech-based user interface from the standard user interface incorporating the set of valid speech inputs.

2. The method of claim 1 further comprising associating audio data with at least some of the outputs in the set of available outputs for use with a speech generation system to define a set of available speech outputs, the automatically created speech-based user interface further incorporating the set of available speech outputs.

3. The method of claim 2 wherein the audio data comprises at least two language sets.

4. The method of claim 2 further comprising validating at least one speech output in the set of available speech outputs based on at least one speech input in the set of available speech inputs.

5. The method of claim 1 wherein the speech-based user interface graphically presents an output from the set of available outputs.

6. The method of claim 1 further comprising receiving speech-interface template data defining at least one rule used in the speech-based user interface to present a speech prompt or accept a speech input.

7. The method of claim 1 further comprising automatically creating a graphic user interface from the standard user interface.

8. The method of claim 1 wherein the standard user interface further defines conditions for presentation of individual available outputs from the set of available outputs.

9. The method of claim 1, further comprising associating the set of valid speech inputs and the set of available speech outputs with the software service definition to generate a reusable speech interface library for the service definition.

10. A system comprising:
    a speech recognition engine;
    a specification server storing at least one of a software service definition or a standard user interface generated from the software service definition, wherein the software service definition comprises at least a set of valid inputs, a set of available outputs and context data related to at least one input from the set of valid inputs or one output from the set of available outputs, and wherein no audio data are associated with the software service definition and no audio data are initially associated with the software standard user interface;
    an interface generator adapted to automatically generate a speech-enabled user interface from the standard user interface, wherein the speech-enabled user interface is generated by associating audio data with at least some of the inputs in the set of valid inputs and capable of receiving speech-based user inputs through the speech recognition engine.

11. The system of claim 10, wherein the automatically generated speech-enabled user interface is adapted to graphically present at least one output from the set of available outputs.

12. The system of claim 10, wherein the interface generator is further capable of automatically generating the speech-enabled user interface by associating audio data with each output in the set of available outputs.

13. The system of claim 12, further comprising an audio data server capable of storing at least one of the audio data associated with at least some of the inputs in the set of valid inputs or the audio data associated with at least some of the outputs in the set of available outputs for use in connection with the speech-enabled user interface.

14. The system of claim 10, wherein the audio data server is further capable of storing the set of available outputs, the set of available outputs comprising outputs in more than one language.

15. The system of claim 10, wherein the automatically generated speech-enabled user interface is adapted to identify a language of a speech-enabled input, interpret the speech-enabled input, and provide at least one output in the identified language of the speech-enabled input.

16. An article comprising a machine-readable medium storing instructions for causing computer processing apparatus to perform operations comprising:

receiving standard user interface data generated from service definition data, wherein no audio data are associated with the software service definition and no audio data are initially associated with the software standard user interface;

parsing the standard user interface data to identify a set of valid inputs comprising at least one valid input, a set of available outputs comprising at least one available output, and context data associated with at least one valid input or available output;

populating a memory device with audio data corresponding to at least one of the valid inputs; and rendering the standard user interface data by associating the audio data with the standard user interface data to generate a speech-enabled user interface.

17. The article of claim 16 wherein the machine-readable medium further stores instructions for causing computer processing apparatus to perform operations comprising populating the memory device with audio data corresponding to at least one of the available outputs.

18. The article of claim 16 wherein the standard user interface data is received from a remote computer device.

19. The article of claim 16 wherein at least one of the set of valid inputs or set of available outputs is based on the context data.

20. The article of claim 16 wherein the standard user interface data is rendered further by modifying the standard user interface data with speech-specific template data to generate the speech-enabled user interface.

* * * * *